United States Patent
Silver

(10) Patent No.: US 10,752,781 B2
(45) Date of Patent: Aug. 25, 2020

(54) AQUEOUS INKS CONTAINING SOLVENT DYES

(71) Applicant: E I DU PONT DE NEMOURS AND COMPANY, Wilmington, DE (US)

(72) Inventor: James A. Silver, Kennett Square, PA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 16/066,747

(22) PCT Filed: Dec. 22, 2016

(86) PCT No.: PCT/US2016/068197
§ 371 (c)(1),
(2) Date: Jun. 28, 2018

(87) PCT Pub. No.: WO2017/116942
PCT Pub. Date: Jul. 6, 2017

(65) Prior Publication Data
US 2019/0010332 A1  Jan. 10, 2019

Related U.S. Application Data

(60) Provisional application No. 62/272,176, filed on Dec. 29, 2015.

(51) Int. Cl.
| | | |
|---|---|---|
| *C09D 11/033* | (2014.01) | |
| *C09B 67/22* | (2006.01) | |
| *C09D 11/102* | (2014.01) | |
| *C09D 11/107* | (2014.01) | |
| *C09D 11/328* | (2014.01) | |
| *D06P 5/30* | (2006.01) | |
| *D06P 1/04* | (2006.01) | |
| *D06P 1/18* | (2006.01) | |
| *D06P 1/52* | (2006.01) | |
| *C09D 11/037* | (2014.01) | |
| *D06P 1/06* | (2006.01) | |

(52) U.S. Cl.
CPC ........ *C09B 67/0051* (2013.01); *C09D 11/033* (2013.01); *C09D 11/037* (2013.01); *C09D 11/102* (2013.01); *C09D 11/107* (2013.01); *C09D 11/328* (2013.01); *D06P 1/04* (2013.01); *D06P 1/06* (2013.01); *D06P 1/18* (2013.01); *D06P 1/525* (2013.01); *D06P 1/5285* (2013.01); *D06P 5/30* (2013.01)

(58) Field of Classification Search
CPC . C09B 67/0051; C09B 11/328; C09B 11/037; C09B 11/033; C09B 11/102; C09B 11/107; D06P 1/5285; D06P 5/30; D06P 1/04; D06P 1/06; D06P 1/18; C09D 11/328; C09D 11/037; C09D 11/033; C09D 11/10; C09D 11/107
USPC ....................................................... 523/160
See application file for complete search history.

(56) References Cited

U.S. PATENT DOCUMENTS

| | | |
|---|---|---|
| 5,847,740 A | 12/1998 | Yamamoto et al. |
| 6,656,228 B1 | 12/2003 | Sherwin et al. |
| 6,844,377 B1 | 1/2005 | Auweter et al. |
| 2002/0081421 A1 | 6/2002 | Bagwell et al. |
| 2003/0144375 A1* | 7/2003 | Wu ................. C09D 11/30 523/160 |
| 2005/0193499 A1 | 9/2005 | Chevli |
| 2007/0058014 A1 | 3/2007 | Burglin |
| 2007/0151479 A1* | 7/2007 | Hasemann .......... C09B 29/30 106/31.48 |

FOREIGN PATENT DOCUMENTS

DE  4217973 A1  12/1993

OTHER PUBLICATIONS

Society of Dyers and Colourists, Bradford, Yorkshire, UK and published in The Color Index, Third Edition, 1971 (copy not provided).
PCT International Search Report for Application No. PCT/US2016/068197; Constantinescu, R., Authorized Officer; ISA/EPO; dated Oct. 4, 2017.
Eliel, E. et al., Stereochemistry of Organic Compounds, John Wiley & Sons, 1994 (Book Not Supplied).

* cited by examiner

*Primary Examiner* — Hannah J Pak
(74) *Attorney, Agent, or Firm* — Simon L Xu

(57) ABSTRACT

The present invention pertains to an aqueous ink containing mixtures of solvent dyes and disperse dyes suitable for printing on hydrophobic textile substrates.

8 Claims, No Drawings

AQUEOUS INKS CONTAINING SOLVENT DYES

CROSS REFERENCE TO RELATED APPLICATIONS

This application claims priority under 35 U.S.C. § 119 from U.S. Provisional Application Ser. No. 62/272,176, filed Dec. 29, 2015, which is incorporated by reference in its entirety.

BACKGROUND OF THE INVENTION

The present disclosure pertains to a dye-based inkjet ink and, more particularly, to a dye-based inkjet ink suitable for printing on textile.

Digital printing methods such as inkjet printing are becoming increasingly important for the printing of textiles and offer a number of potential benefits over conventional printing methods such as screen printing. Digital printing eliminates the set up expense associated with screen preparation and can potentially enable cost-effective short run production. Inkjet printing furthermore allows visual effects, like infinite pattern repeat sizes, that cannot be practically achieved with a screen-printing process.

One area of textile printing ideally suited to digital printing is the flag and banner market where short runs are common. However, printing of flags and banners presents unique challenges. For example, ink is printed on one side, but must penetrate the fabric so that the image is equally visible on the back (unprinted) side as on the front (printed) side. In addition, while the ink must travel through the fabric, it must not travel laterally causing blurring and bleeding. This seemingly contradictory set of conditions is not easily achieved. Furthermore, the printed products will typically be displayed in sunny areas and the colorants in the inks are preferably resistant to light fade.

U.S. Pat. No. 5,847,740 discloses an inkjet printing process on nylon cloth. US20050193499 discloses flag and banner printing methods and pretreatment solutions therefor.

Typically disperse dyes are used as colorants in digital inks for printing on polyester fabrics. Selection of specific Colour Index (CI) dyes have varied between ink manufacturers, but have generally been limited to the disperse class of CI dyes.

A need exists for inkjet inks with wide gamut and desirable light-fastness for printing on textile. The present disclosure satisfies this need by providing aqueous inks containing solvent dyes in addition to disperse dyes.

SUMMARY OF THE INVENTION

An embodiment provides an aqueous ink jet ink for printing on textile, said ink comprising an aqueous vehicle and a water-insoluble colorant dispersed by a polymeric dispersant, wherein said colorant comprises one or more solvent dyes having a structure of Formula I and one or more solvent dyes having a structure of Formula II:

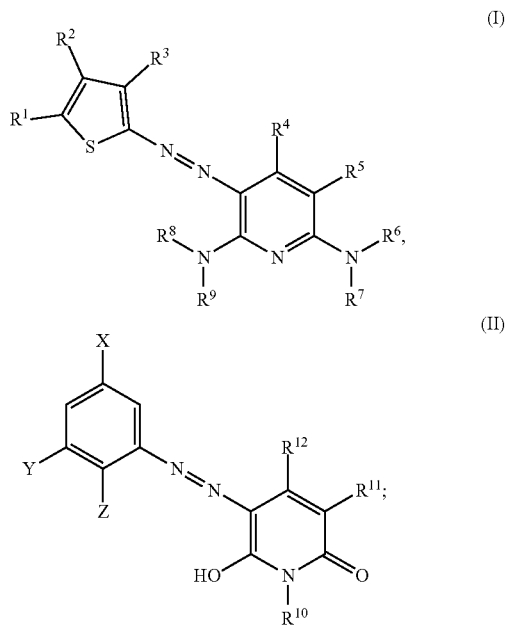

wherein:
$R^1$ and $R^3$ are independently CN or optionally substituted $C_1$-$C_8$ alkoxycarbonyl;
$R^2$ and $R^4$ are independently H or optionally substituted $C_1$-$C_3$ alkyl;
$R^5$ is CN, optionally substituted $C_1$-$C_8$ alkylsulphonyl or optionally substituted $C_1$-$C_8$ alkoxycarbonyl;
$R^6$ is optionally substituted $C_1$-$C_8$ alkyl, optionally substituted $C_1$-$C_8$ alkoxycarbonyl, optionally allyl substituted $C_3$-$C_7$ cycloalkyl or optionally substituted $C_6$-$C_{10}$ aryl;
$R^7$ is H or independently of $R^6$ and has the definition of $R^6$;
$R^8$ is optionally substituted $C_1$-$C_8$ alkyl, optionally substituted $C_1$-$C_8$ alkoxycarbonyl, optionally ally substituted $C_3$-$C_7$ cycloalkyl or optionally substituted $C_6$-$C_{10}$ aryl;
$R^9$ is H or independently of $R^6$ and has the definition of $R^6$;
$R^{10}$ is H, $C_1$-$C_8$ alkyl or optionally substituted $C_1$-$C_8$ alkyl;
$R^{11}$ is CN or H;
$R^{12}$ is H or $C_1$-$C_8$ alkyl; and
X, Y, Z are independently H, $NO_2$, Cl, Br, F, $C_1$-$C_5$ alkyl, $C_1$-$C_8$ alkylcarbonyl, optionally substituted $C_1$-$C_{20}$ alkoxycarbonyl, optionally substituted $C_6$-$C_{20}$ phenoxysulfonate or optionally substituted $C_6$-$C_{20}$ arylsulfonate.

Another embodiment provides that the ink further comprising a water miscible organic solvent.

Another embodiment provides that the polymeric dispersant is acrylic.

Another embodiment provides that the ink further comprising a shading component.

Another embodiment provides that the ink further comprising a polymeric binder wherein said binder is different from said polymeric dispersant.

Another embodiment provides that the polymeric binder is polyurethane.

Another embodiment provides that the polymeric binder is acrylic.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION

Unless otherwise stated or defined, all technical and scientific terms used herein have commonly understood meanings by one of ordinary skill in the art to which this invention pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

As used herein, the term "aqueous vehicle" refers to water or a mixture of water and at least one water-soluble, or partially water-soluble (i.e. methyl ethyl ketone), organic solvent (co-solvent).

As used herein, the term "MW" means weight average molecular weight.

As used herein, the term "Mn" means number average molecular weight.

As used herein, the term "D50" means the volume particle diameter of the 50th percentile (median) of the distribution of particle sizes.

As used herein, the term 'D95' means the volume particle diameter of the 95th percentile of the distribution of particle sizes.

As used herein, the term "cPs" means centipoise, a viscosity unit.

As used herein, the term "mN·m$^{-1}$" means milliNewtons per meter, a surface tension unit.

As used herein, the term "mPa·s" means millipascal second, a viscosity unit.

As used herein, the term "substituted alkyl" denotes substitution of hydrogen atom(s) on an alkyl moiety by functional group(s) including ethers, esters, amines, thioether, mercaptans, hydroxy, halides, and acid groups, etc.

As used herein, the term "substituted arylsulfonate" denotes substitution of hydrogen atom(s) on an arylsulfonate moiety by alkyl or functional group(s) including ethers, esters, amines, thioether, mercaptans, hydroxy, halides, and acid groups, etc. Another depiction of the arylsulfonate moiety is Ar—SO$_2$O—, where Ar is an aryl group.

Unless otherwise noted, the above chemicals were obtained from Aldrich (Milwaukee, Wis.) or other similar suppliers of laboratory chemicals.

In addition, references in the singular may also include the plural (for example, "a" and "an" may refer to one, or one or more) unless the context specifically states otherwise.

Colorants

The inks of the present ink set are characterized by the presence of particular, specified colorants. The colorants (dyes) are substantially solvent dyes. Solvent dyes are typically used in solvent based, non-aqueous inks, or aqueous inks wherein the dye is dissolved in a solvent such as acetone or mixed with a dispersant followed by removal of the solvent by evaporation. The use of solvents is undesirable from several points of view including safety hazards and environmental effects. The inventors surprisingly found that certain solvent dyes can be dispersed by a polymeric dispersant and used in an aqueous media. In the present disclosure, the solvent dyes are used in an aqueous ink instead of a solvent based, non-aqueous ink.

Reference to the specified dyes is made by their "C.I." designation established by Society Dyers and Colourists, Bradford, Yorkshire, UK and published in *The Color Index*, Third Edition, 1971. Sources of these dyes are generally well known to those of ordinary skill in the relevant art.

The solvent dyes of the present disclosure include the ones having a structure of Formula I and Formula II:

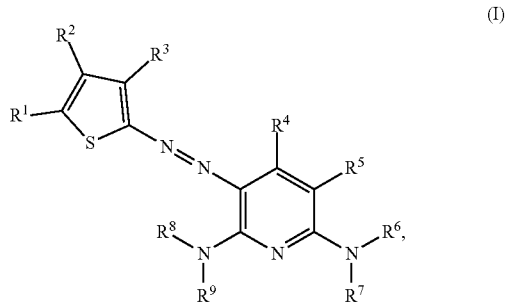

(I)

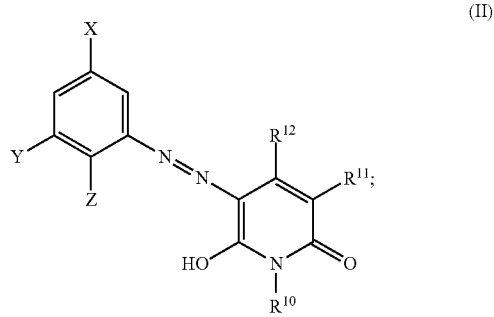

(II)

wherein:

$R^1$ and $R^3$ are independently CN or optionally substituted $C_1$-$C_8$ alkoxycarbonyl;

$R^2$ and $R^4$ are independently H or optionally substituted $C_1$-$C_3$ alkyl;

$R^5$ is CN, optionally substituted $C_1$-$C_8$ alkylsulphonyl or optionally substituted $C_1$-$C_8$ alkoxycarbonyl;

$R^6$ is optionally substituted $C_1$-$C_8$ alkyl, optionally substituted $C_1$-$C_8$ alkoxycarbonyl, optionally ally substituted $C_3$-$C_7$ cycloalkyl or optionally substituted $C_6$-$C_{10}$ aryl;

$R^7$ is H or independently of $R^6$ and has the definition of $R^6$;

$R^8$ is optionally substituted $C_1$-$C_8$ alkyl, optionally substituted $C_1$-$C_8$ alkoxycarbonyl, optionally ally substituted $C_3$-$C_7$ cycloalkyl or optionally substituted $C_6$-$C_{10}$ aryl;

$R^9$ is H or independently of $R^6$ and has the definition of $R^6$;

$R^{10}$ is H, $C_1$-$C_8$ alkyl or optionally substituted $C_1$-$C_8$ alkyl;

$R^{11}$ is CN or H;

$R^{12}$ is H or $C_1$-$C_8$ alkyl; and

X, Y, Z are independently H, $NO_2$, Cl, Br, F, $C_1$-$C_5$ alkyl, $C_1$-$C_8$ alkylcarbonyl, optionally substituted $C_1$-$C_{20}$ alkoxycarbonyl, optionally substituted $C_6$-$C_{20}$ phenoxysulfonate or optionally substituted $C_6$-$C_{20}$ arylsulfonate.

Compounds of Formula (I) and Formula (II) include all geometric and stereoisomers. can exist as one or more stereoisomers. Stereoisomers are isomers of identical constitution but differing in the arrangement of their atoms in space and include enantiomers, diastereomers, cis-trans isomers (also known as geometric isomers), and tautomers. For a comprehensive discussion of all aspects of stereoisomerism, see Ernest L. Eliel and Samuel H. Wilen, *Stereochemistry of Organic Compounds*, John Wiley & Sons, 1994.

Vehicle

The vehicle is a carrier for the colorant. An "aqueous vehicle" refers to a vehicle comprised of water or a mixture of water and at least one water-soluble organic solvent (co-solvent). Selection of a suitable mixture depends on requirements of the specific application, such as desired surface tension and viscosity, the selected colorant, and compatibility with substrate onto which the ink will be printed.

Examples of water-soluble organic solvents include alcohols, ketones, ketoalcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether.

An aqueous vehicle will typically contain about 30% to about 95% water with the balance (i.e., about 70% to about 5%) being the water-soluble solvent.

Additives

Other ingredients, additives, may be formulated into the inkjet ink, to the extent that such other ingredients do not interfere with the stability and jetablity of the finished ink, which may be readily determined by routine experimentation. Such other ingredients are in a general sense well known in the art.

Commonly, surfactants are added to the ink to adjust surface tension and wetting properties. Suitable surfactants include ethoxylated acetylene diols (e.g. Surfynols® series from Air Products), ethoxylated primary (e.g. Tomadol® series from Tomah Products) and secondary (e.g. Tergitol® series from Union Carbide) alcohols, sulfosuccinates (e.g. Aerosol® series from Cytec), organosilicones (e.g. Silwet® series from GE Silicons) and fluoro surfactants (e.g. Zonyl® series from DuPont). Surfactants are typically used in the amount of about 0.01 to about 5% and preferably about 0.2 to about 2%, based on the total weight of the ink.

Polymers may be added to the ink to improve durability. The polymers can be soluble in the vehicle or dispersed (e.g. "emulsion polymer" or "latex"), and can be ionic or nonionic. Useful classes of polymers include acrylics, styrene-acrylics and polyurethanes.

Biocides may be used to inhibit growth of microorganisms. Buffers may be used to maintain pH. Buffers include, for example, tris(hydroxymethyl)-aminomethane ("Trizma" or "Tris").

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

The amount of vehicle in an ink is typically in the range of from about 70 wt % to about 99.8 wt %, and more typically from about 80 wt % to about 99 wt %. Colorant is generally present in amounts up to about 15 wt %. For flag and banner applications, the colorant is typically in the range of from about 3 wt % to about 12 wt %. Percentages are weight percent of the total weight of ink.

Other ingredients (additives), when present, generally comprise less than about 15 wt %, based on the total weight of the ink. Surfactants, when added, are generally in the range of from about 0.2 wt % to about 3 wt %, based on the total weight of the ink. Polymers can be added as needed, but will generally be less than about 15 wt %, based on the total weight of the ink.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C., but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic.

Substrate

The instant ink is suitable for printing on textile, and especially advantageous for printing substrate that is synthetic polyamide fabric, and particularly flag and banner stock. Most commonly, the synthetic polyamide fabric fibers are nylon-6 and/or nylon-6,6 fibers. For flag and banner stock, the fabric is generally from about 70 to about 200 deniers. A commercial example of such stock is SolarMax® 185 bright Nylon 200 denier, SGS-667/50, prepared for print; and SolarMax® 185 bright HT Nylon 70 denier, SGS773/76, prepared for print, both commercially available from Glen Raven Mills (Glen Raven, N.C.). SolarMax® is a trademark of Invista.

Suitable printing substrate also includes paper. Typically, an image is printed on paper followed by transferring the printed image by heat or other means to a textile.

The fabric is commonly pretreated prior to printing. Application of the pretreatment to the fabric can be any convenient method and such methods are generally well-known in the art. One example is an application method referred to as padding. In padding, a fabric is dipped in the pretreatment solution, then the saturated fabric is passed through nip rollers that squeeze out the excess solution. The amount of solution retained in the fabric can be regulated by the nip pressure applied by the rollers. Other pretreatment techniques include spray application wherein the solution is applied by spraying on the face or face and back of the fabric. The wet pick-up of pretreatment solution is preferably from about 20 and about 100 grams of solution, and more preferably from about 25 to about 75 grams of solution, per 100 grams of fabric.

After application of pretreatment the fabric is dried in any convenient manner. The final percent moisture is (approximately) equal to the equilibrium moisture of the pretreated fabric at ambient temperature, and can vary somewhat depending on the relative humidity of the surrounding air.

The resins remaining in the fabric after drying provide the absorbent layer for the inkjet inks during printing. It will be appreciated that sufficient resin must be present to absorb the ink load applied. On the other hand, the presence of too much resin may prevent proper penetration. Routine optimization will reveal appropriate coating levels for a given printer and ink set.

Other suitable pretreatments include those disclosed in U.S. Pat. No. 6,656,228 and U.S. Patent Application Publication No. 20020081421, the disclosures of which are incorporated by reference herein for all purposes as if fully set forth.

Printing Method

Printing can be accomplished by any inkjet printer equipped for handling and printing fabric. Commercial printers include, for example, the Dupont™ Artistri™ 3210 and 2020 printers, and the Mimaki TX series of printers.

The amount of ink laid down on the fabric can vary by printer model, by print mode (resolution) within a given printer and by the percent coverage need to achieve a given color. The combined effect of all these considerations is grams of ink per unit area of fabric for each color. In one embodiment, ink coverage is preferably from about 5 to about 17 grams of ink per square meter of fabric. There is a balance between the ink density needed to achieve a desired color and the absorption capacity of the coating resins in the pretreatment.

Printed fabric will typically be post-treated according to procedures well-known in the textile art. A preferred post treatment is to heat the printed fabric with steam-treatment to set the printed inks, and washing the steam-treated fabric.

EXAMPLES

Six inks were prepared with colorants and loads listed in Table 1 below. Inks were prepared and jetted using a Seiko print rig. Various color wedges were printed on 250 denier woven polyester fabric which was fused with hot air at 400 F (204° C.) for 2 minutes. DR 177 represents Direct Red 177, R1 represents Solvent Red 195, and Y1 represents Direct Yellow 114.

TABLE 1

| Examples | Colorants and Loads (weight %) |
| --- | --- |
| 1 | DR 177, 5% dye load (Comparative) |
| 2 | 0.516% Y1, 4.484% R1 dye load |
| 3 | 0.400% Y1, 4.600% R1 dye load |
| 4 | 0.634% Y1, 4.366% R1 dye load |
| 5 | 0.750% Y1, 4.250% R1 dye load |
| 6 | R1, 5% dye load (Control) |

The gamut properties of the above ink were measured and presented in Table 2 below. Data was measured using D65 illuminant with 2 degree observer.

TABLE 2

| Ex. | Ink Coverage (g/m^2) | L* | a* | b* | C* | h | K/S | Sat |
| --- | --- | --- | --- | --- | --- | --- | --- | --- |
| 1 | 18.0 | 34.884 | 48.543 | 18.781 | 52.049 | 21.151 | 12.766 | 1.492 |
|   | 16.2 | 35.484 | 50.162 | 19.756 | 53.913 | 21.495 | 12.910 | 1.519 |
|   | 14.4 | 36.364 | 51.785 | 20.745 | 55.786 | 21.831 | 12.831 | 1.534 |
|   | 12.6 | 37.265 | 53.010 | 21.229 | 57.103 | 21.825 | 12.681 | 1.532 |
|   | 10.8 | 38.201 | 54.293 | 21.919 | 58.550 | 21.985 | 12.443 | 1.533 |
|   | 9.0 | 39.217 | 55.469 | 22.419 | 59.828 | 22.007 | 12.186 | 1.526 |
|   | 7.2 | 40.790 | 57.305 | 23.370 | 61.888 | 22.186 | 11.998 | 1.517 |
|   | 5.4 | 43.748 | 58.778 | 23.329 | 63.239 | 21.647 | 10.664 | 1.446 |
|   | 3.6 | 47.365 | 58.895 | 21.476 | 62.689 | 20.034 | 8.574 | 1.324 |
|   | 1.8 | 56.967 | 51.032 | 12.777 | 52.609 | 14.047 | 4.333 | 0.924 |
| 2 | 18.0 | 36.284 | 52.213 | 20.988 | 56.273 | 21.899 | 13.084 | 1.551 |
|   | 16.2 | 36.892 | 53.709 | 21.707 | 57.930 | 22.006 | 13.185 | 1.570 |
|   | 14.4 | 37.695 | 55.419 | 22.308 | 59.741 | 21.926 | 13.205 | 1.585 |
|   | 12.6 | 38.295 | 56.794 | 22.730 | 61.174 | 21.812 | 13.317 | 1.597 |
|   | 10.8 | 39.161 | 58.467 | 22.945 | 62.808 | 21.427 | 13.490 | 1.604 |
|   | 9.0 | 40.227 | 59.531 | 22.565 | 63.664 | 20.759 | 13.053 | 1.583 |
|   | 7.2 | 41.872 | 61.340 | 22.190 | 65.231 | 19.887 | 12.619 | 1.558 |
|   | 5.4 | 44.350 | 63.025 | 20.108 | 66.156 | 17.694 | 11.572 | 1.492 |
|   | 3.6 | 48.231 | 62.648 | 14.299 | 64.259 | 12.857 | 8.569 | 1.332 |
|   | 1.8 | 58.881 | 53.768 | 1.906 | 53.804 | 2.017 | 4.308 | 0.914 |
| 3 | 18.0 | 36.288 | 52.506 | 20.568 | 56.391 | 21.392 | 13.085 | 1.554 |
|   | 16.2 | 36.700 | 54.079 | 21.259 | 58.107 | 21.460 | 13.493 | 1.583 |
|   | 14.4 | 37.492 | 55.636 | 21.767 | 59.743 | 21.368 | 13.510 | 1.593 |
|   | 12.6 | 38.203 | 57.194 | 22.136 | 61.328 | 21.158 | 13.637 | 1.605 |
|   | 10.8 | 39.243 | 58.759 | 21.971 | 62.732 | 20.502 | 13.510 | 1.599 |
|   | 9.0 | 40.281 | 59.877 | 21.421 | 63.594 | 19.684 | 13.147 | 1.579 |
|   | 7.2 | 41.921 | 61.887 | 20.697 | 65.257 | 18.492 | 12.917 | 1.557 |

TABLE 2-continued

| Ex. | Ink Coverage (g/m^2) | L* | a* | b* | C* | h | K/S | Sat |
|---|---|---|---|---|---|---|---|---|
| | 5.4 | 44.577 | 63.403 | 18.121 | 65.942 | 15.950 | 11.473 | 1.479 |
| | 3.6 | 48.149 | 63.367 | 13.154 | 64.719 | 11.726 | 8.848 | 1.344 |
| | 1.8 | 58.734 | 54.160 | 0.814 | 54.167 | 0.854 | 4.089 | 0.922 |
| 4 | 17.9 | 36.698 | 52.784 | 21.348 | 56.938 | 22.020 | 12.814 | 1.551 |
| | 16.1 | 37.103 | 54.591 | 22.281 | 58.963 | 22.202 | 13.386 | 1.589 |
| | 14.3 | 37.800 | 56.414 | 23.028 | 60.933 | 22.205 | 13.756 | 1.612 |
| | 12.5 | 38.643 | 57.496 | 23.538 | 62.127 | 22.263 | 13.511 | 1.608 |
| | 10.7 | 39.612 | 59.064 | 23.878 | 63.709 | 22.012 | 13.564 | 1.608 |
| | 9.0 | 40.743 | 60.099 | 23.480 | 64.523 | 21.339 | 13.102 | 1.584 |
| | 7.2 | 42.171 | 61.739 | 23.767 | 66.157 | 21.054 | 12.852 | 1.569 |
| | 5.4 | 44.672 | 63.235 | 21.738 | 66.867 | 18.971 | 11.697 | 1.497 |
| | 3.6 | 48.601 | 63.057 | 16.085 | 65.078 | 14.309 | 8.817 | 1.339 |
| | 1.8 | 58.325 | 55.087 | 3.702 | 55.217 | 3.831 | 4.093 | 0.947 |
| 5 | 18.2 | 36.664 | 53.211 | 22.248 | 57.674 | 22.690 | 13.204 | 1.573 |
| | 16.4 | 37.303 | 54.835 | 22.935 | 59.439 | 22.697 | 13.304 | 1.593 |
| | 14.6 | 37.918 | 56.228 | 23.484 | 60.935 | 22.668 | 13.521 | 1.607 |
| | 12.7 | 38.695 | 57.561 | 24.130 | 62.414 | 22.743 | 13.501 | 1.613 |
| | 10.9 | 39.777 | 59.090 | 24.395 | 63.928 | 22.433 | 13.416 | 1.607 |
| | 9.1 | 40.641 | 60.141 | 24.285 | 64.859 | 21.989 | 13.304 | 1.596 |
| | 7.3 | 42.280 | 61.540 | 23.968 | 66.043 | 21.280 | 12.746 | 1.562 |
| | 5.5 | 44.724 | 63.043 | 22.642 | 66.986 | 19.755 | 11.657 | 1.498 |
| | 3.6 | 48.390 | 62.681 | 17.693 | 65.131 | 15.761 | 8.891 | 1.346 |
| | 1.8 | 58.647 | 53.221 | 5.145 | 53.476 | 5.491 | 4.269 | 0.912 |
| 6 | 18.2 | 35.815 | 51.471 | 15.692 | 53.810 | 16.955 | 12.636 | 1.502 |
| | 16.4 | 36.701 | 53.077 | 16.462 | 55.572 | 17.231 | 12.382 | 1.514 |
| | 14.6 | 37.400 | 54.599 | 16.856 | 57.142 | 17.157 | 12.381 | 1.528 |
| | 12.7 | 38.112 | 56.005 | 17.045 | 58.541 | 16.928 | 12.361 | 1.536 |
| | 10.9 | 39.099 | 57.950 | 16.991 | 60.390 | 16.341 | 12.397 | 1.545 |
| | 9.1 | 40.196 | 59.690 | 16.588 | 61.952 | 15.531 | 12.281 | 1.541 |
| | 7.3 | 41.675 | 61.739 | 15.682 | 63.700 | 14.252 | 12.033 | 1.529 |
| | 5.5 | 43.881 | 64.141 | 13.217 | 65.489 | 11.643 | 11.398 | 1.492 |
| | 3.6 | 46.910 | 65.262 | 8.437 | 65.805 | 7.366 | 9.561 | 1.403 |
| | 1.8 | 55.756 | 60.174 | −2.571 | 60.234 | 357.546 | 4.280 | 1.080 |

The invention claimed is:

1. An aqueous ink jet ink for printing on textile, said ink comprising an aqueous vehicle and a water-insoluble colorant dispersed by a polymeric dispersant, wherein said colorant comprises one or more solvent dyes having a structure of Formula I and one or more solvent dyes having a structure of Formula II:

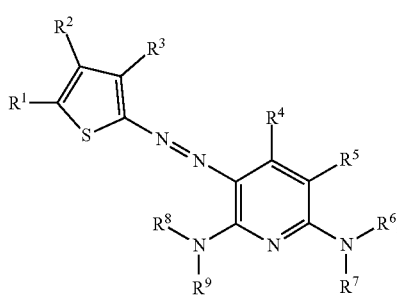

(I)

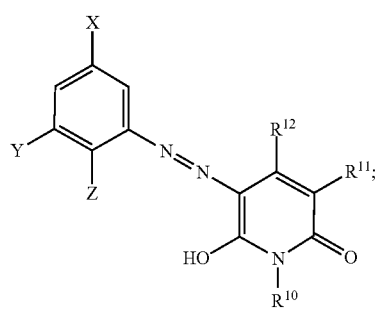

(II)

wherein:
$R^1$ and $R^3$ are independently CN or optionally substituted $C_1$-$C_8$ alkoxycarbonyl;
$R^2$ and $R^4$ are independently H or optionally substituted $C_1$-$C_3$ alkyl;
$R^5$ is CN, optionally substituted $C_1$-$C_8$ alkylsulphonyl or optionally substituted $C_1$-$C_8$ alkoxycarbonyl;
$R^6$ is optionally substituted $C_1$-$C_8$ alkyl, optionally substituted $C_1$-$C_8$ alkoxycarbonyl, optionally allyl substituted $C_3$-$C_7$ cycloalkyl or optionally substituted $C_6$-$C_{10}$ aryl;
$R^7$ is H or independently of $R^6$ and has the definition of $R^6$;
$R^8$ is optionally substituted $C_1$-$C_8$ alkyl, optionally substituted $C_1$-$C_8$ alkoxycarbonyl, optionally allyl substituted $C_3$-$C_7$ cycloalkyl or optionally substituted $C_6$-$C_{10}$ aryl;
$R^9$ is H or independently of $R^6$ and has the definition of $R^6$;
$R^{10}$ is H, $C_1$-$C_8$ alkyl or optionally substituted $C_1$-$C_8$ alkyl;
$R^{11}$ is CN or H;
$R^{12}$ is H or $C_1$-$C_8$ alkyl;
Y is Cl, Br, F, $C_1$-$C_5$ alkyl, $C_1$-$C_8$ alkylcarbonyl, optionally substituted $C_1$-$C_{20}$ alkoxycarbonyl, optionally substituted $C_6$-$C_{20}$ phenoxysulfonate or optionally substituted $C_6$-$C_{20}$ arylsulfonate; and
X and Z are independently H, $NO_2$, Cl, Br, F, $C_1$-$C_5$ alkyl, $C_1$-$C_8$ alkylcarbonyl, optionally substituted $C_1$-$C_{20}$ alkoxycarbonyl, optionally substituted $C_6$-$C_{20}$ phenoxysulfonate or optionally substituted $C_6$-$C_{20}$ arylsulfonate.

2. The ink of claim 1, wherein the ink further comprises a water miscible organic solvent.

3. The ink of claim 2, wherein said polymeric dispersant is acrylic.

4. The ink of claim 1, wherein the ink further comprises a shading component.

5. The ink of claim 4, wherein said polymeric dispersant is acrylic.

6. The ink of claim 1, wherein the ink further comprises a polymeric binder wherein said binder is different from said polymeric dispersant.

7. The ink of claim 6, wherein said polymeric binder is polyurethane.

8. The ink of claim 6, wherein said polymeric binder is acrylic.

\* \* \* \* \*